US009313352B2

(12) United States Patent
Suzuki et al.

(10) Patent No.: US 9,313,352 B2
(45) Date of Patent: Apr. 12, 2016

(54) COMMUNICATION APPARATUS FOR SETTING GROUP OWNERSHIP INTENT, COMMUNICATION METHOD FOR SETTING GROUP OWNERSHIP INTENT, AND STORAGE MEDIUM FOR SETTING GROUP OWNERSHIP INTENT

(71) Applicant: CANON KABUSHIKI KAISHA, Tokyo (JP)

(72) Inventors: Takeshi Suzuki, Inagi (JP); Takashi Moriya, Yokohama (JP); Arata Miyagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/302,165

(22) Filed: Jun. 11, 2014

(65) Prior Publication Data
US 2014/0368863 A1 Dec. 18, 2014

(30) Foreign Application Priority Data

Jun. 14, 2013 (JP) ................................. 2013-125882
Mar. 17, 2014 (JP) ................................. 2014-054177

(51) Int. Cl.
*H04N 1/00* (2006.01)
(52) U.S. Cl.
CPC ....... *H04N 1/00899* (2013.01); *H04N 1/00888* (2013.01)
(58) Field of Classification Search
CPC .......... H04N 1/00885; H04N 1/00106; H04N 1/00899; H04N 1/00888
USPC ...................................................... 358/1.14
See application file for complete search history.

(56) References Cited

U.S. PATENT DOCUMENTS

| 2003/0220076 | A1* | 11/2003 | Katayama | H04W 52/0219 455/41.2 |
|---|---|---|---|---|
| 2005/0143046 | A1* | 6/2005 | Suzuki | H04W 84/20 455/343.2 |
| 2008/0174819 | A1* | 7/2008 | Hada | G03G 15/5004 358/1.15 |
| 2008/0279158 | A1* | 11/2008 | Schmidt | H04L 63/0428 370/338 |
| 2009/0024799 | A1* | 1/2009 | Jahagirdar | G06F 1/3203 711/130 |
| 2009/0086662 | A1* | 4/2009 | Okada | H04W 52/0287 370/311 |
| 2009/0240781 | A1* | 9/2009 | Otsuka | H04W 84/20 709/208 |
| 2009/0247094 | A1* | 10/2009 | Sakoda | H04W 16/14 455/78 |
| 2011/0225305 | A1* | 9/2011 | Vedantham | G06F 1/3203 709/227 |
| 2011/0292300 | A1* | 12/2011 | Nagara | H04N 5/44513 348/734 |
| 2012/0158981 | A1* | 6/2012 | Desai | H04L 67/04 709/230 |
| 2012/0172060 | A1* | 7/2012 | Qing | H04M 1/7253 455/456.6 |
| 2012/0195227 | A1* | 8/2012 | Vedantham | H04W 52/0232 370/253 |
| 2012/0224569 | A1* | 9/2012 | Kubota | H04W 84/20 370/338 |
| 2012/0316695 | A1* | 12/2012 | Chen | H02J 3/008 700/296 |
| 2013/0040576 | A1* | 2/2013 | Yoon | H04W 8/005 455/41.2 |

(Continued)

FOREIGN PATENT DOCUMENTS

JP 2011-249960 A 12/2011

*Primary Examiner* — Tammy Pham
*Assistant Examiner* — Edwin S Leland, III
(74) *Attorney, Agent, or Firm* — Canon U.S.A., Inc. IP Division

(57) ABSTRACT

A communication apparatus is capable of wirelessly communicating with a communication partner apparatus in a peer-to-peer mode. A state of supplying electric power to the communication apparatus is determined, and a group owner intent value indicating the degree of intent to operate as an access point in wireless communication is changed from a default value to a value depending on the state of the supplying electric power.

20 Claims, 12 Drawing Sheets

(56) References Cited

U.S. PATENT DOCUMENTS

| | | | | |
|---|---|---|---|---|
| 2013/0044635 | A1* | 2/2013 | Suzuki | H04W 76/023 370/254 |
| 2013/0045678 | A1* | 2/2013 | Lee | H04W 4/08 455/39 |
| 2013/0183905 | A1* | 7/2013 | Richardson | H04W 56/0015 455/67.11 |
| 2014/0078928 | A1* | 3/2014 | Verma | H04W 84/20 370/254 |
| 2014/0092421 | A1* | 4/2014 | Shibata | H04N 1/00233 358/1.14 |
| 2014/0098727 | A1* | 4/2014 | Murabito | H04W 52/0277 370/311 |
| 2014/0201280 | A1* | 7/2014 | Qi | H04W 4/005 709/204 |
| 2014/0207895 | A1* | 7/2014 | Otsuka | H04W 8/005 709/208 |

\* cited by examiner

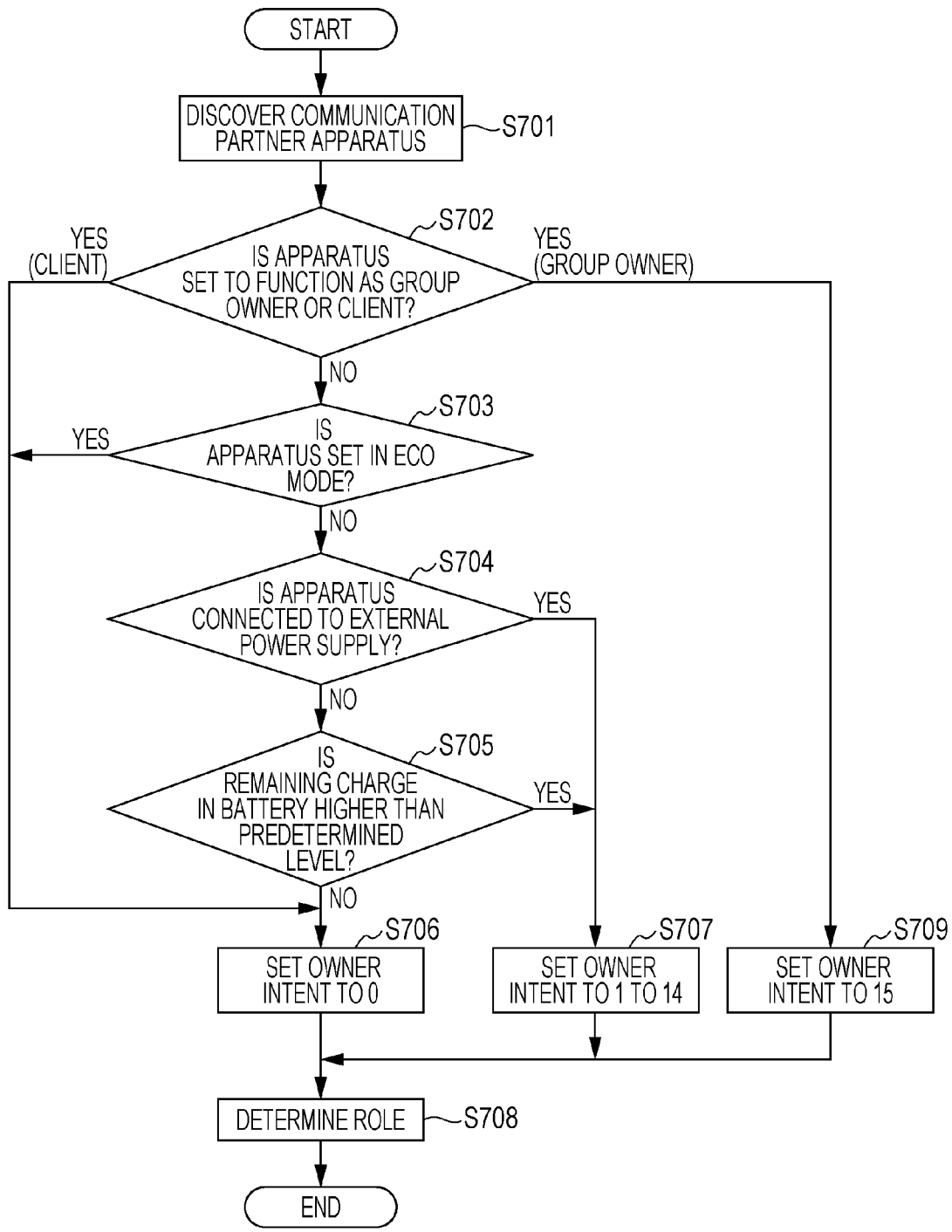

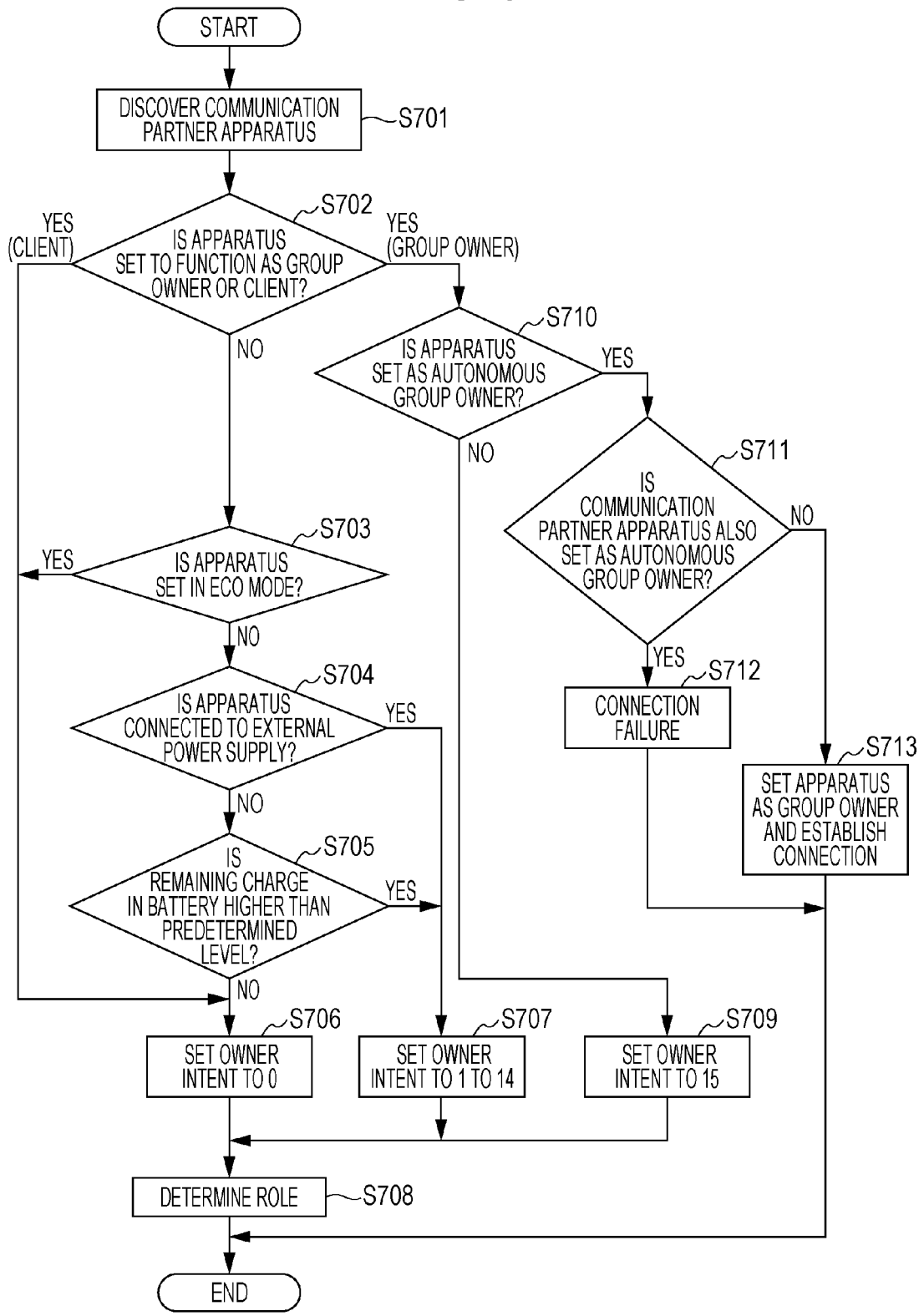

COMMUNICATION APPARATUS FOR SETTING GROUP OWNERSHIP INTENT, COMMUNICATION METHOD FOR SETTING GROUP OWNERSHIP INTENT, AND STORAGE MEDIUM FOR SETTING GROUP OWNERSHIP INTENT

BACKGROUND

1. Field

Aspects of the present invention generally relates to a communication apparatus having a wireless connection capability, and a method and program therefor.

2. Description of the Related Art

In wireless communication, one known technique of wirelessly connecting to an apparatus on the other side (hereinafter, also referred to as a communication partner apparatus) is to make a wireless connection via an access point (AP). It is also known to make a direct wireless connection to a communication partner apparatus using a peer-to-peer (P2P) wireless connection technique, in which a communication apparatus on one side or a communication apparatus on the other side operates as an AP. Wi-Fi Direct® is known as a standard for the P2P wireless connection.

A device supporting a Wi-Fi Direct® function is capable of operating as an AP (group owner) and providing service. The Wi-Fi Direct® function allows the device to make a direct wireless connection with a communication partner apparatus. In the Wi-Fi Direct®, a determination as to which device (a communication apparatus on one side or a communication apparatus on the other side) operates as an AP is made via a sequence called group owner Negotiation (Japanese Patent Laid-Open No. 2011-249960).

When a communication apparatus operates as a group owner, it operates as an AP, and thus power consumption per unit time increases. The communication apparatus operating as the AP periodically outputs a beacon signal and communicates with many communication apparatuses in parallel, which results in an increase in processing load and thus results in an increase in power consumption. Therefore, in a state in which power consumption is to be suppressed, if a communication apparatus takes the role of a group owner, unwanted power consumption occurs.

SUMMARY OF THE INVENTION

In view of the above, aspects of the present invention generally provide a communication apparatus capable of suppressing power consumption in wireless communication in a peer-to-peer mode by controlling so as not to operate as an access point in a situation in which power consumption is to be suppressed.

In an exemplary embodiment, a communication apparatus capable of wirelessly communicating with a communication partner apparatus in a peer-to-peer mode, includes a determination unit configured to determine a state of supplying power to the communication apparatus, and a setting unit configured to change a default value of an intent value to a value depending on a result of the determination performed by the determination unit wherein the intent value indicates a degree of intent to operate as an access point in the wireless communication, wherein the default value is a value set when the communication apparatus is produced or a value set by a user.

Further features of the present disclosure will become apparent from the following description of exemplary embodiments with reference to the attached drawings.

BRIEF DESCRIPTION OF THE DRAWINGS

FIG. 7 is a flow chart illustrating a process of determining roles.

FIG. 9 is a flow chart illustrating a process of determining roles.

DESCRIPTION OF THE EMBODIMENTS

The present disclosure is described in detail below with reference to embodiments in conjunction with drawings. Relative locations of constituent elements, contents of display screens, and the like described below in the embodiments are provided merely for illustrating examples but not for limitation.

Figure 1:
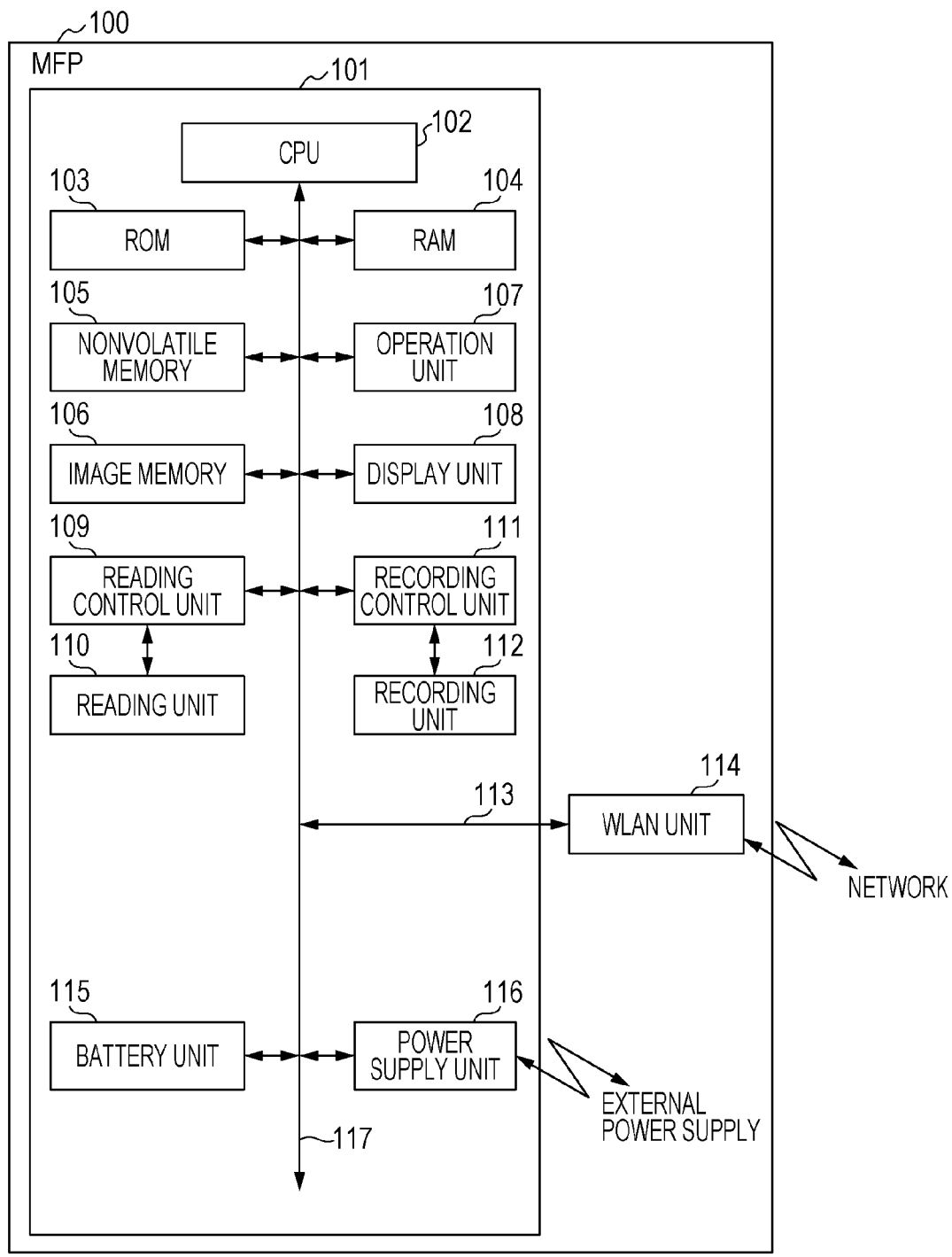
FIG. 1 is a diagram illustrating a configuration of a multi-function printer (MFP).

FIG. 1 is a block diagram schematically illustrating a configuration of a multi-function printer (MFP) 100 having a wireless LAN (WLAN) communication function, which is an example of a communication apparatus according to an embodiment of the invention. In the description below, it is assumed by way of example that the MFP 100 has a reading function and a recording (printing) function, but the functions are not limited to these and the MFP 100 may have a wide variety of functions. For example, the MFP 100 may not have one or both of the functions described above but may have another function, or the MFP 100 have one or more other functions in addition to those described above. Examples of the other functions include a telephone/facsimile function (using a telephone line/IP network), a small-distance wireless communication function (Bluetooth (registered trademark) communication, NFC (Near Field Communication)), and the like. That is, the MFP 100 is an apparatus capable of wirelessly communicating with a communication partner apparatus.

The MFP 100 includes a CPU 102, a ROM 103, a RAM 104, a nonvolatile memory 105, an image memory 106, an operation unit 107, a display unit 108, a reading control unit 109, a recording control unit 111, a battery unit 115, and a power supply unit 116, which are all disposed on a main board 101. The MFP 100 also includes a WLAN unit 114 connected via a bus cable 113. The constituent elements described above are connected to each other via a system bus 117 thereby allowing them to communicate with each other via the system bus 117. The MFP 100 further includes a reading unit 110 that provides a function of reading an image on a document, and a recording unit 112 that provides a function of storing the image on a recording medium.

The CPU 102 controls the whole MFP 100. Processes described below of the MFP 100 are performed under the control of the CPU 102. The ROM 103 stores control programs executed by the CPU 102, an embedded operating system (OS) program, and the like. In the present embodiment, the control programs stored in the ROM 103 control software such as scheduling software, task switch software, and the like, under the control of the embedded OS stored in the ROM 103. The RAM 104 stores data such as program control variables and also stores data such as set values registered by a user, management data associated with the MFP 100, and the like. The RAM 104 includes buffer areas for various kinds of works. The nonvolatile memory 105 may be realized by a flash memory or the like, and is capable of retaining the data even after the power is turned off. The image memory 106 may be realized by a dynamic RAM (DRAM) or the like, and is used to store image data input via the reading unit 110 or image data received from the outside.

The operation unit 107 includes a hard switch and the like, and is configured to accept an operation performed by a user and inform the CPU 102 of an operation content. The display unit 108 displays various kinds of information associated with the MFP 100 (for example, guide information on an operation to be performed by a user, information indicating a status of the MFP 100, and the like). The display unit 108 may be constructed integrally with the operation unit 107 into the form of a touch panel or the like.

The reading control unit 109 controls a reading unit (scanner) 110 (for example, a contact image sensor (CIS)) to optically read an image on a document and generate image data corresponding to the read image.

The recording control unit 111 converts the input image data into recording data for use in recording (printing) by the recording unit (printer) 112, and the recording control unit 111 controls the recording unit 112 to record the image on a recording medium such as paper by applying a recording agent to the storage medium. The recording unit 112 may be, for example, an ink-jet printer configured to emit ink serving as a recording agent from a recording head onto a recording medium thereby recording an image thereon.

The recording control unit 111 converts the input image data into recording data for use in recording (printing) by the recording unit (printer) 112, and the recording control unit 111 controls the recording unit 112 to record the image on a recording medium such as paper by applying a recording agent to the storage medium. The recording unit 112 may be, for example, an ink-jet printer configured to emit ink serving as a recording agent from a recording head onto a recording medium thereby recording an image thereon.

The battery unit 115 is a unit (a battery) that supplies power necessary for the MFP 100 to operate. Even in a situation in which no power is supplied from an external power supply such as a commercial power supply (AC power supply), the battery unit 115 is capable of supplying power to the MFP 100. Therefore, as long as power is supplied from the battery unit 115, a user is allowed to freely carry the MFP 100. The battery unit 115 may be installed inside the MFP 100, or the battery unit 115 may be of a type that is removably installed. The battery unit 115 is capable of being charged with power supplied from an external power supply (a commercial power supply or the like). After being charged, the MFP 100 is capable of operating without being supplied with power from the external power supply as long as the charge remaining in the battery unit 115 is sufficient to operate the MFP 100. The power supply unit 116 receives power supplied from the external power supply (commercial power supply (AC power supply)) via a power cable and supplies power to the MFP 100 to allow the MFP 100 to operate. In a case where the battery unit 115 is installed in the battery unit 115, the power supply unit 116 is capable of supplying power to the battery unit 115 thereby charging it. The power supply unit 116 also has a function of converting an alternating current supplied from the external power supply into a direct current.

The MFP 100 may be in one of power supply states (states of supplying power) such as a state in which the power to the MFP 100 is in an on-state while being connected to an external power supply, a state in which the MFP 100 is in the on-state without being connected to an extern power supply and while being supplied with power from the battery unit 115. The state in which the MFP 100 is in the on-state refers to a state in which a power switch included in the operation unit 107 is in an on-state. Furthermore, the power supply states possible for the MFP 100 include a software power off state in which the power is off while maintaining the MFP 100 connected to the external power supply, a power off state in which power from the battery unit 115 is off when the MFP 100 is not connected to the external power supply. In this power off state, a soft power switch included in the operation unit 107 is in an off-state in which the reading function using the reading unit 110 and the recording function using the recording unit 112 are disabled, but a counting operation using a timer and the like are maintained active. The power supply states possible for the MFP 100 also include a hard power off state in which power supplied to the MFP 100 is completely turned off. The power supply states possible for the MFP 100 further include a state in which the MFP 100 is not connected to an external power supply and the battery unit 115 is supplying power to the MFP 100 but the remaining charge in the battery unit 115 is not sufficient. When the MFP 100 is in the power on state, the MFP 100 may be in one of two modes, that is, a normal operation mode in which all constituent elements described above are in an operable state, or an eco (power saving) mode in which power supplied to the display unit 108, the reading unit 110, the recording unit 112, and the like in a standby mode is reduced thereby suppressing power consumption. The mode may be switched according to a command issued by a user via the operation unit 107, or may be switched according to a time schedule. The mode may also be switched, for example, when the MFP 100 has been in an unused state for a particular period. In the case where the MFP 100 is in the eco mode, power supplied from the battery unit 115 or the power supply unit 116 is reduced.

Figure 2:
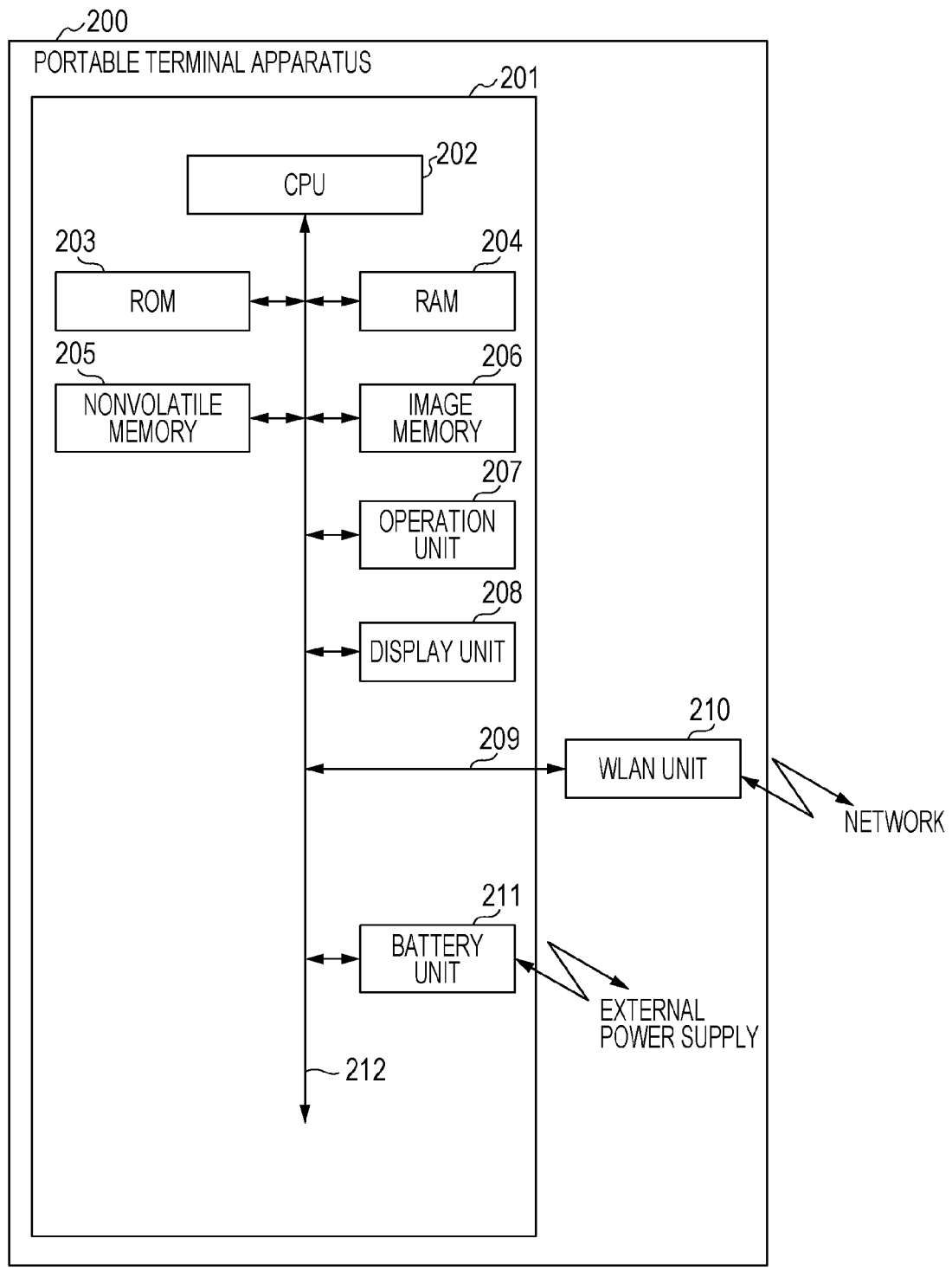
FIG. 2 is a diagram illustrating a configuration of a portable terminal.

FIG. 2 is a block diagram schematically illustrating a configuration of a portable terminal 200 according to an exemplary embodiment. The portable terminal 200 may be a portable telephone, a smartphone, a notebook-type personal computer, a table terminal, a personal digital assistant (PDA) device, a digital camera, or the like.

The portable terminal 200 includes a CPU 202, a ROM 203, a RAM 204, a nonvolatile memory 205, an image memory 206, an operation unit 207, a display unit 208, and a battery unit 211, which are all disposed on a main board 201. The portable terminal 200 also includes a WLAN unit 210 connected via a bus cable 209. The constituent elements described above are connected to each other via a system bus 212 thereby allowing them to communicate with each other via the system bus 212. The constituent elements are similar to those described above with reference to FIG. 1, and thus a further description thereof is omitted.

The battery unit 211 of the portable terminal 200 is of a type capable of directly being charged from an external power supply. Therefore, in a state in which the battery unit 211 is not attached to the portable terminal 200, power is not supplied to the portable terminal 200 even when the portable terminal 200 is connected to the external power supply. In a case where the remaining charge in the battery unit 211 is sufficient to allow the portable terminal 200 to operate, the portable terminal 200 is capable of operating without being connected to the external power supply, and a user is allowed to carry the portable terminal 200 and use it. The charging of the battery unit 211 using the external power supply is performed by supplying power to the battery unit 211 from a commercial power supply (AC power supply) via a charger. The battery unit 211 may be charged in a state in which the charger is connected to the commercial power supply and to the portable terminal 200 via a cable. Alternatively, the battery unit 211 may be charged by wireless power supply using electromagnetic induction, magnetic resonance, microwave, direct current resonance, or the like. The battery unit 211 may be charged by another technique such as a solar power source which converts incident solar light into electric power. Note that the method of supplying electric power to the portable terminal 200 is not limited to that described above, but many other methods are applicable. For example, a similar method to that using the battery unit and the power supply unit illustrated in FIG. 1 may be used.

The nonvolatile memory 205 is capable of storing various kinds of application software executed by the CPU 202 to realize various kinds of functions. Such kinds of application software include a web browser function and an e-mail function. Note that FIG. 2 illustrates only main constituent elements of the portable terminal 200, and the portable terminal 200 may include other elements such as a telephone function, a camera function, a Bluetooth (registered trademark) communication function, a NFC function, a global positioning system (GPS) function, a microphone function, a speaker function, a television receiver function, and so on.

P2P (Peer to Peer) Technique

In a WLAN communication circumstance, direct communication between apparatuses using a P2P (Peer to Peer) technique without passing through an AP may be realized in a plurality of modes. In any mode, when a device is to perform searching, the device searches for a device (communication partner device) to which to communicate using a device search command (for example, Probe Request frame) to discover a communication partner device. When the device search command is transmitted, various attributes (parameters) may be attached to the device search command. It is recommended that in a case where an attribute is specified in the device search command, a response to the device search command is returned based on a best interpretation performed within the scope of the specifications of the current mode or the scope of the specifications (Wi-Fi specifications in the case of WFD). Even in a case where the information (including the attributes described above) attached to the device search command includes uninterpretable information, it is possible to respond to the received device search command based on only interpretable information.

The P2P communication may be performed in three modes described below.

Mode A (software AP mode)
Mode B (Wi-Fi Direct® (WFD) mode)
Mode C (WFD extension mode)

Figure 3:
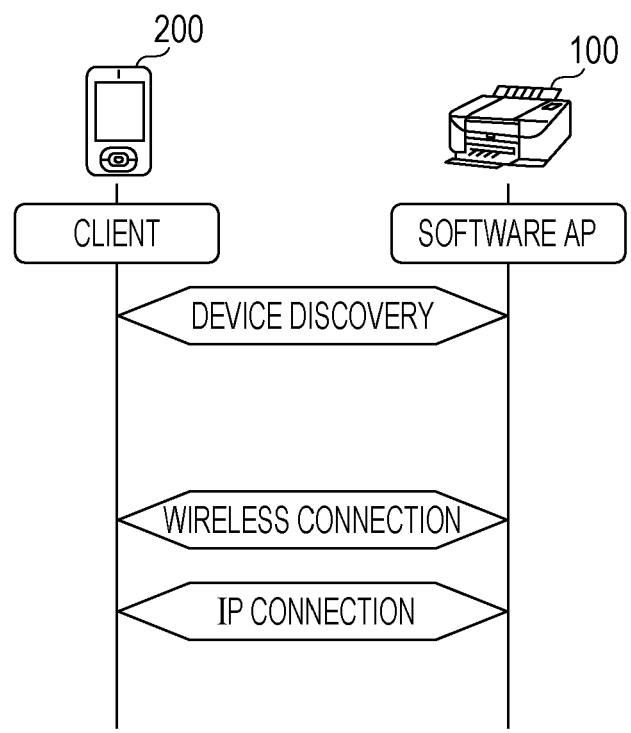
FIG. 3 is a diagram illustrating a wireless connection sequence in a software access point (AP) mode.
Figure 4:
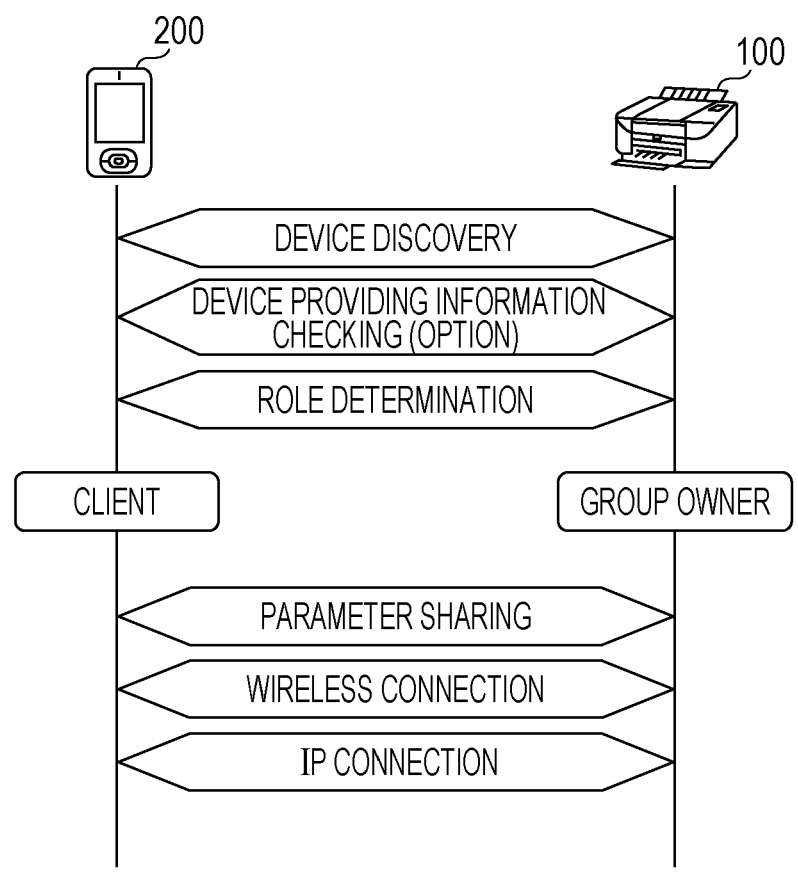
FIG. 4 is a diagram illustrating a wireless connection sequence in a Wi-Fi Direct® (WFD) mode.
Figure 5:
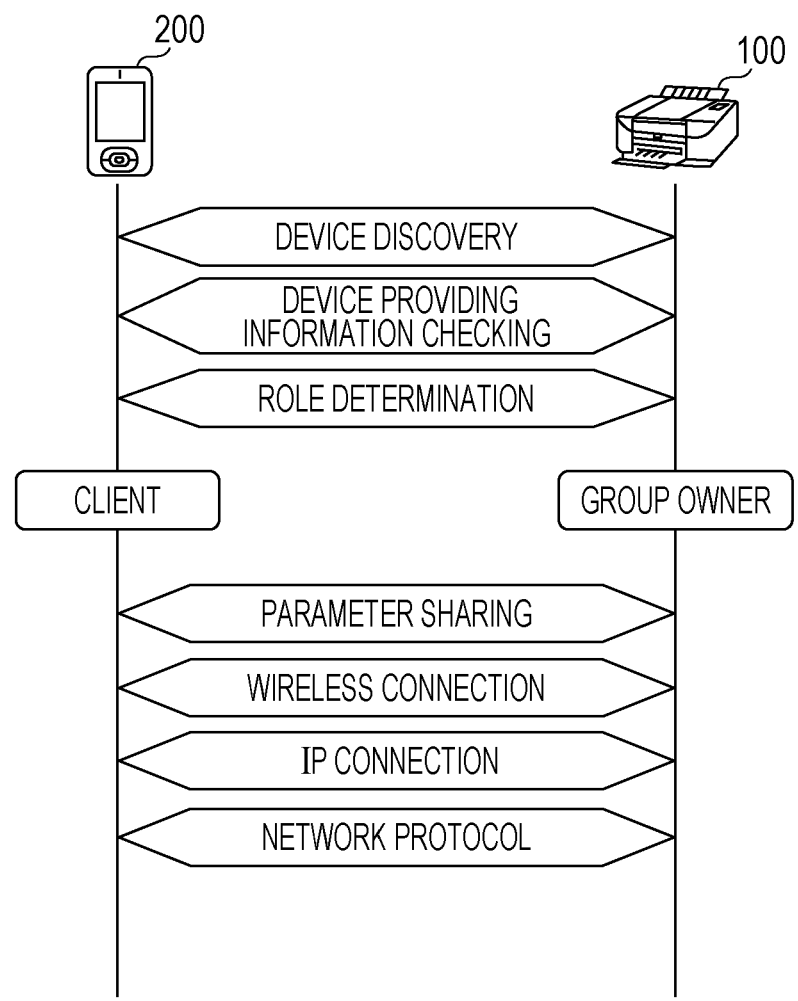
FIG. 5 is a diagram illustrating a wireless connection sequence in a Wi-Fi Direct® (WFD) extension mode.

Depending on the mode, there may be a difference in supported types of devices, and there may also be difference in usable applications. Referring to FIG. 3 to FIG. 5, a wireless connection sequence is described below for each mode.

FIG. 3 is a diagram illustrating a wireless connection sequence in the mode A (software AP mode). In the software AP mode, when devices (for example, the portable terminal 200 and the MFP 100) are to communicate with each other, one of the devices (for example, the portable terminal 200) is a client that issues a request for various kinds of services. The other device (for example, the MFP 100) operates as a software AP, that is, as an access point realized by software on the WLAN. In the software AP mode, using a device search command, a client searches for a device operable as a software AP. If a software AP is discovered, a wireless connection process (including a wireless connection establishment, and the like) is performed between the client and the software AP, and then an IP connection process (including IP address assignment, and the like) is performed. As for commands and parameters transmitted between the client and the software AP to establish a wireless connection, commands and parameters defined in the Wi-Fi standard may be used, and thus a description thereof is omitted.

FIG. 4 is a diagram illustrating a wireless connection sequence in the mode B (WFD mode). In the WFD mode, after a communication partner device is discovered using a device search command, a determination is made as to which device is to take a role of a group owner in P2P and which device is to take a role of a client in P2P, and then a wireless connection is established. The process of determining the roles corresponds to a GO Negotiation process in P2P. More specifically, first, one of devices that are to perform communication issues a device search command to search for a device to which to make a connection in the WFD mode. If the device to which to communicate is discovered, confirmation is performed between the two devices as to information representing services and functions that each device is capable of providing (available function/service confirmation). This available function/service confirmation is optional, and is not indispensable. The available function/service confirmation phase corresponds to Provision Discovery (PD) in P2P. Based on the information on function/service available at each device, a determination is made as to which device is to play the role of a client in P2P and which device is to play the role of a group owner. For example, the portable terminal 200 may take the role of a client and the MFP 100 may take the role of a group owner. After the client and the group owner in P2P are determined, parameters to be used in the Wi-Fi Direct® communication are exchanged between the devices (parameter exchange phase). Based on the parameters, a wireless connection process and an IP connection process are performed between the client and the group owner. This parameter exchange phase corresponds, for example, to a process of automatically exchanging parameters associated with wireless LAN security using Wi-Fi Protected Setup. The device determined to operate as the group owner periodically outputs, as the AP, a beacon signal via the WLAN unit and communicates with a plurality of communication partner apparatuses in parallel, which causes an increase in power consumption. On the other hand, the device operates as the client consumes less power per unit time than the group owner.

FIG. 5 is a diagram illustrating a wireless connection sequence in the mode C (WFD extension mode). The WFD extension mode is an extension of the WFD mode. In the WFD extension mode, unlike the WFD mode in which the available function/service confirmation is optional, the available function/service confirmation process is indispensable. In this WFD extension mode, information indicating service desired to be used is exchanged between devices using a Service Discovery (SD) command. The process other than this is similar to that described above with reference to FIG. 4. In the mode C, after the IP connection process, a service connection process is performed as an extension process to use the service determined in the above-described manner.

Next, a description is given below as to a process of adjusting an owner intent (group owner intent) value indicating the degree of the intent to operate as a group owner (a device that manages a network group in wireless communication or a device that provides a service) in the P2P mode (WFD mode). A default value of the owner intent is set in advance (before wireless connection is made) in the communication apparatus. The default value of the owner intent is stored in the nonvolatile memory (105 or 205) when the communication apparatus is produced. That is, the default value is set before a user starts using the communication apparatus. The default value may be set by a user by operating an operation panel or the like of the MFP 100 before the wireless connection is made. The owner intent may take a value in the range, for example, from 0 (minimum) to 15 (maximum). Negotiation is performed between communication apparatuses, and one having a greater owner intent value operates a group owner. Next, referring to FIG. 6, the operation in the wireless connection phase in the WFD mode (mode B, mode C) is described in detail below. Note that the sequence illustrated in FIG. 6 corresponds to the sequence illustrated in FIG. 4 or FIG. 5.

Next, referring to FIG. 6, the operation in the wireless connection phase in the WFD mode (mode B, mode C) is described in detail below. Note that the sequence illustrated in FIG. 6 corresponds to the sequence illustrated in FIG. 4 or FIG. 5.

P1001: A device search is performed to discover a communication partner apparatus. More specifically, for example, one communication apparatus (for example, the portable terminal 200) issues a device search request (Discovery) command, and the other communication apparatus (for example, the MFP 100) operating as the communication partner apparatus responds to the device search request (Discovery) command.

P1002: After the communication partner apparatus is determined, confirmation is performed between the two apparatuses as to services and functions that each device is capable of providing (available function/service confirmation). This is performed using an Optional Discovery command, a SD command, and a PD command.

P1003: Group owner negotiation is performed to determine which device is to play the role of a client and which device is to play the role of a group owner (Group Formation). For example, the portable terminal 200 may take the role of a client and the MFP 100 may take the role of a group owner. The group owner negotiation process to determine the group owner includes exchanging three pieces of information (3-way information exchanging) using a GO Negotiation Request frame, a GO Negotiation Response frame, a GO Negotiation Confirmation frame. In a case where the Group Owner Negotiation fails, each communication apparatus may confirm whether the Group Owner Negotiation fails or not by monitoring a GO Negotiation Response frame using a packet capture tool. Furthermore, in the case where the Group Owner Negotiation fails, it is possible to realize a factor that caused the failure. Alternatively, in the case where the Group Owner Negotiation fails, each communication apparatus may analyze the GO Negotiation Response frame. In this analysis, a value of Status Code in Status attribute in the GO Negotiation Response frame is detected. Based on the detected value, a determination is performed as to whether the Group Owner Negotiation fails. Furthermore, in the case where the Group Owner Negotiation fails, it is possible to realize a factor that caused the failure.

P1004: After the client and the group owner are determined, parameters to be used in the Wi-Fi Direct® communication are exchanged between the apparatuses (WPS sequence).

P1005: A remaining process for establishing a wireless connection is performed between the client and the group owner.

P1006: An IP connection process is performed between the client and the group owner.

P1007: Communication using a network protocol is performed between the client and the group owner.

Figure 6:
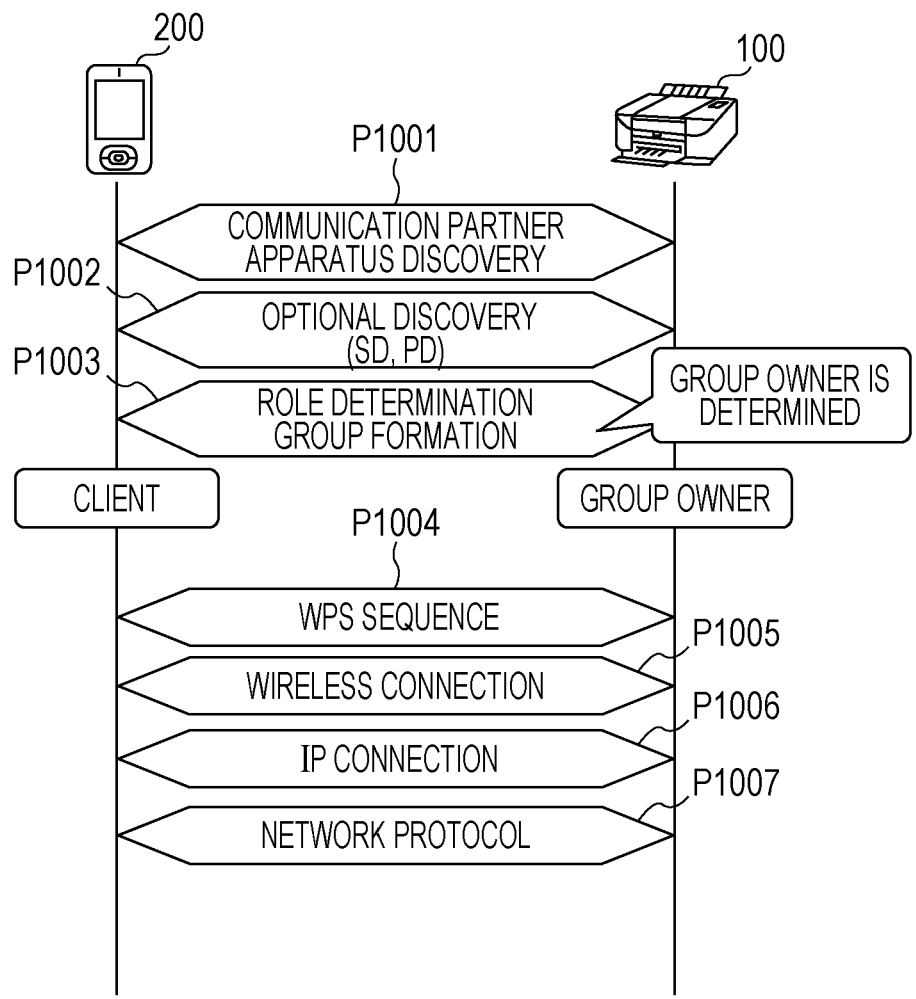
FIG. 6 is a diagram illustrating details of an operation in a wireless connection phase in the Wi-Fi Direct® (WFD) technique.

An example of a process performed by the MFP 100 in P1001 to P1003 illustrated in FIG. 6 is described below. FIG. 7 is a flow chart illustrating a process performed by the CPU 102 of the MFP 100 by loading the program from the ROM 103 into the RAM 104 and executing it.

In the following description with reference to FIG. 7, it is assumed by way of example that the MFP 100 issues a device search request to discover a communication partner apparatus (for example, the portable terminal 200) and then the MFP 100 detects the setting made in the MFP 100 and the power supply state and furthermore MFP 100 sets the owner intent value of the MFP 100 based on the detected state. Note that the apparatus that performs the above-described process is not limited to the MFP 100, but the process may be performed by portable terminal 200.

In FIG. 7, in S701, the MFP 100 discovers a communication partner apparatus (the portable terminal 200) in the P2P mode (P1001). Thereafter, if necessary, the process in P1002 is performed, and then processing flow proceeds to S702. In a case where the process in P1002 is not necessary, the processing flow proceeds directly to S702 from S701.

In S702, the MFP 100 determines whether the setting performed in terms of the role of group owner/client of the MFP 100 exists in the nonvolatile memory 105. This setting is performed by a user in advance using the operation unit 107 and the display unit 108 to specify which role is to be given to the MFP 100 in the role determination phase. In a case where the setting specifies the group owner, the processing flow proceeds to S709. In a case where the client is specified in the setting, the processing flow proceeds to S706. In a case where neither is specified, the processing flow proceeds to S703. Although in the present example, the setting of the role of the group owner/client is performed by a user using the operation unit 107 and the display unit 108, the owner intent value may be directly specified.

In S703, the MFP 100 determines whether setting information in the nonvolatile memory 105 specifies the eco mode as the mode of the MFP 100. This setting is performed by a user in advance using the operation unit 107 and the display unit 108. In a case where the eco mode is specified in the setting, it is determined that a reduction in power consumption is desired by a user, and thus it is determined that the MFP 100 is to operate as the client, and the processing flow proceeds to S706. On the other hand, in a case where the eco mode is not specified in the setting, the processing flow proceeds to S704.

In S704, it is determined whether the power supply unit 116 is connected to an external power supply (AC power supply). In a case where the power supply unit 116 is connected to an external power supply, sufficient electric power is available, and thus it is allowed to operate as the group owner, and thus the processing flow proceeds to S707. On the other hand, in a case where the power supply unit 116 is not connected to an external power supply, the processing flow proceeds to S705.

In S705, it is determined whether the remaining charge in the battery unit 115 is equal to or larger than a predetermined value. In a case where the remaining charge is equal lower than the particular value, the MFP 100 is to operate as a client which needs less power, and thus the processing flow proceeds to S706. On the other hand, in a case where the remaining charge in the battery is equal to or greater than the predetermined value (expressed, for example in percentage to the fully charged level), the processing flow proceeds to step S707. The predetermined value may be a fixed value, or may be set by a user using the operation unit 107 and the display unit 108. Alternatively, in the case where the remaining charge in the battery is lower than the predetermined value, a message may be displayed on the display unit 108 to inform a user that the remaining charge is not sufficient and ask the user whether the MFP 100 is to operate as a client, and the determination as to whether the MFP 100 is to operate as a client or not is made according to a response from the user. That is, when the response to the inquiry is returned (via an operation using the operation unit 107), if the response indicates that the MFP 100 wants to operate as the client, or in a case where no response is returned, the processing flow may proceed to S706 to operate as the client. On the other hand, in a case where the response indicates refusal, the processing flow may proceed to S707.

In S706, the MFP 100 sets the Owner Intent value to a minimum value, that is, 0. In a case where the Owner Intent value set as a default value is 0, then in S706 the default value is maintained. In a case where the Owner Intent value stored as a default value in the nonvolatile memory 105 is 0, the value is directly used in the setting, but if the default value is not equal to 0, the value is changed to 0. Thereafter, in S708, the roles are determined (P1003). In this specific example, the process of P1003 is performed such that the MFP 100 sets itself as a client, and sets the communication partner apparatus as a group owner. That is, the MFP 100 is set to operate as the client unless the Owner Intent value set in the communication partner apparatus is also 0.

In S707, the MFP 100 sets the Owner Intent value to a value other than the maximum value (15) and the minimum value (0), that is, to a value in the range from 1 to 14. Thereafter, in S708, the MFP 100 communicates with the communication partner apparatus to determine the roles. In this step, the Owner Intent value of the MFP 100 is compared with the Owner Intent value of the communication partner apparatus, and, according to a result of the comparison, one of the MFP 100 and the communication partner apparatus is set as the group owner and the other is set as the client. In the comparison, if the Owner Intent value of the MFP 100 is equal to that of the communication partner apparatus, the Owner Intent of values one of the communication apparatuses is changed depending on various conditions including apparatus types thereby determining the roles.

On the other hand, in S709, the MFP 100 sets the Owner Intent value of the MFP 100 to the maximum value, that is, 15. In the case where the default value is 15, the default value is maintained in S709. On the other hand, in a case where the default value of the Owner Intent stored in the nonvolatile memory 105 is 15, the value is maintained, but in a case where the default value is not equal to 15, the value is changed to 15. Thereafter, in step S708, the roles are determined. In this specific example, the process of P1003 is performed such that the MFP 100 sets itself as a group owner, and sets the communication partner apparatus as a client. That is, the MFP 100 is set to operate as the group owner unless the owner intent value set in the communication partner apparatus is also 15.

Although in S706, the Owner Intent value is set to 0, the Owner Intent value may be set to a value other than 0 if the value is small enough to provide a high probability that the MFP 100 is allowed to operate as a client. Furthermore, although in S709, the Owner Intent value is set to 15, the owner intent value may be set to a value other than 15 if the value is large enough to provide a high probability that the MFP 100 is allowed to operate as a group owner.

After the group owner and the client are determined in the above-described manner, wireless communication is performed according to the determined roles. For example, the MFP 100 may perform a process to provide service such as printing by the recording unit 112 based on image data received from the portable terminal 200.

In the present embodiment, as described above, the communication apparatus is allowed to set the owner intent value of the communication apparatus depending on the result of the determination on the power supply state (S703 to S705) thereby preventing unintended power consumption. That is, for example, even when the communication apparatus is in the eco mode, if the communication apparatus is set to operate as a group owner then an increase in power consumption may occur, which might occur in an operation not according to the present embodiment. In a case where the MFP 100 is operating in a state in which the MFP 100 is not connected to an external power supply and power for the operation is supplied from the battery unit 115, the present embodiment prevents the MFP 100 from being set to operate as a group owner, which may result in an increase in electric power and may further cause the battery to run out.

In the process described above with reference to FIG. 7, the checking is performed as to where the MFP 100 is set to operate in the eco mode, whether the MFP 100 is connected to an external power supply, and whether the remaining charge in the battery is equal to or higher than a predetermined level, and then, depending on the result of the check, the determination is performed as to whether the MFP 100 is set to operate as the group owner. However, it may not be necessary to check all of these items, but it may be determined whether the MFP 100 is set to operate as the group owner depending on a result of checking on one or more of the items.

In the wireless connection sequence illustrated in FIG. 6, in a case where the owner intent value is the same for both apparatuses that are to communicate to each other, it may be impossible to perform the role determination in P1003. In this case, the phases following P1003 is not per formed, and thus the wireless communication in the WFD mode fails. For example, if the owner intent value is the maximum value, that is, 15, for both the portable terminal 200 and the MFP 100, then, in P1003, both the portable terminal 200 and the MFP 100 have the intention of operating as a group owner. That is, both the portable terminal 200 and the MFP 100 do not give up the role of the group owner, and thus the negotiation in P1003 fails. That is, the roles of the group owner and the client are not determined. As a result, the following phases P1004 to P1007 are not performed, and the wireless connection in the WFD mode fails.

Figure 8A:
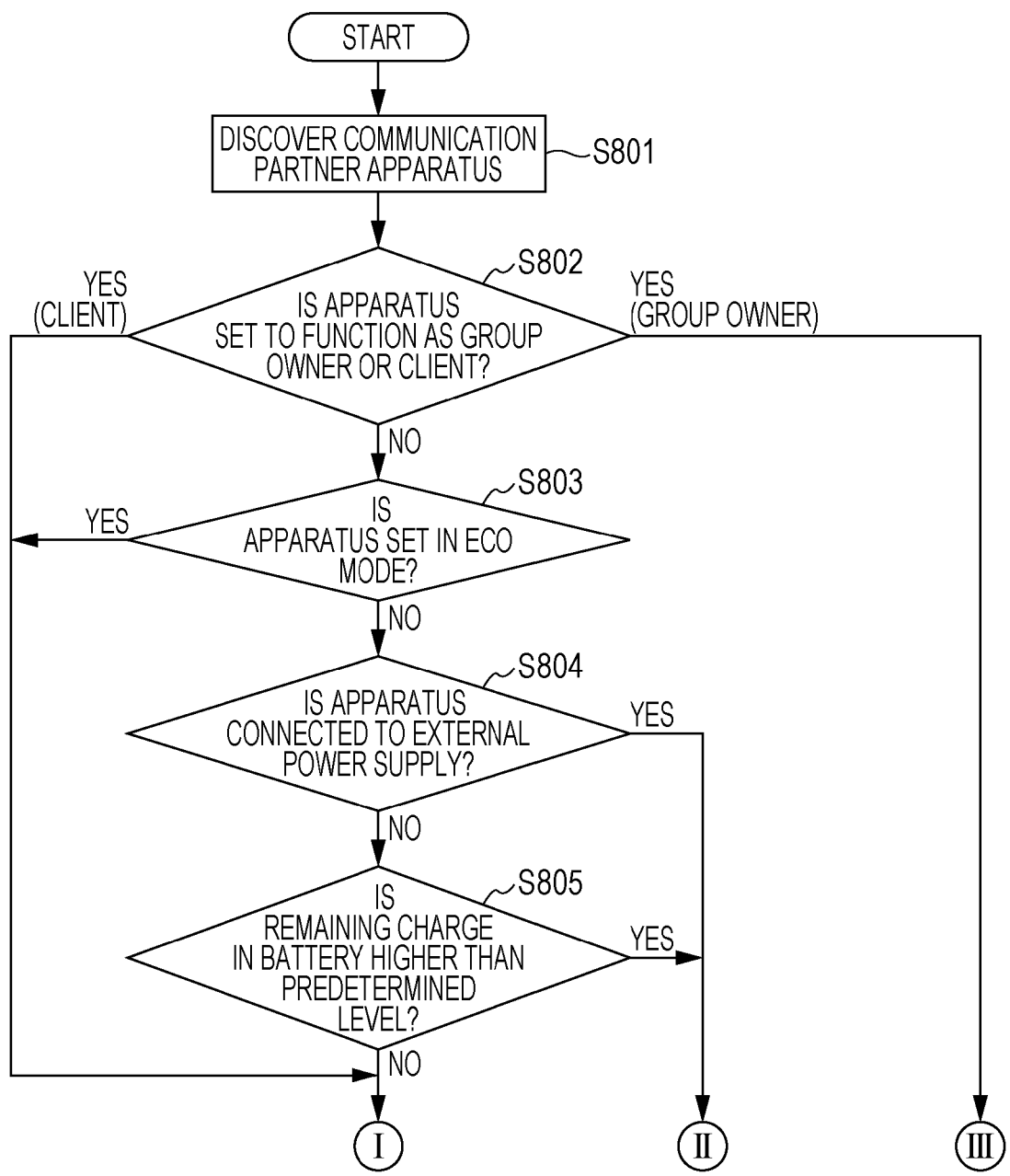
FIGS. 8A and 8B are flow charts illustrating a process of determining roles.
Figure 8B:
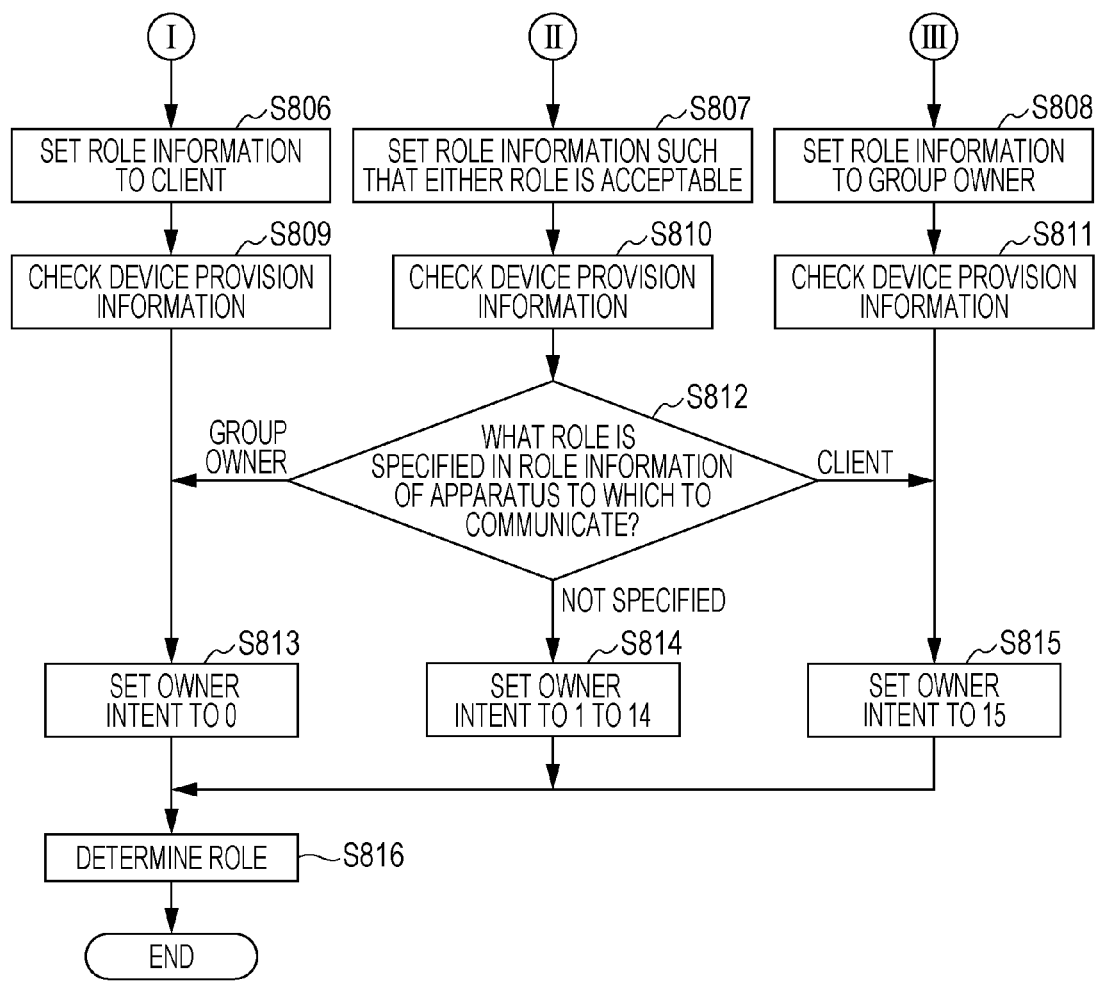

To avoid the above situation, in the flow chart illustrated in FIG. 8, in the phase P1002 before P1003, information indicating which role (the group owner or the client) the communication apparatus wants to take is sent to the communication partner apparatus. According to the information received in P1002, the communication partner apparatus adjusts the Owner Intent value thereof to be send in P1003 thereby making it possible to perform the connection in the WFD mode without failure.

In the wireless connection phase in the WFD mode, when the available function/service confirmation is performed in P1002, the communication apparatus is allowed to inform the communication partner apparatus of service or a function that the communication apparatus. This is used, in the example illustrated in FIG. 8, to send further information, in addition to the Owner Intent value, to notify which role (the group owner or the client) the communication apparatus wants to take.

The flow chart in FIG. 8 illustrates the process performed by the CPU 102 of the MFP 100 by loading the program from the ROM 103 into the RAM 104 and executing the loaded program. Note that the roles taken by the MFP 100 and the portable terminal 200 operating as the communication partner apparatus may be reversed.

In FIG. 8, S801 to S805 are similar to S701 to S705 in FIG. 7, and thus a further description thereof is omitted.

In S806, the MFP 100 specifies the client in the information indicating which role (the group owner or the client) the MFP 100 wants to take. In the available function/service confirmation in S809, the MFP 100 sends the information to the communication partner apparatus to inform that the MFP 100 wants to operate as the client. In this case, the MFP 100 expects that the communication partner apparatus sets the Owner Intent value to be equal to or greater than 1 according to the information transmitted in S809 by the MFP 100, and the MFP 100 sets, in S813, the Owner Intent of the MFP 100 to 0.

In S807, the MFP 100 sets the information indicating which role (the group owner or the client) the MFP 100 wants to take such that either role is acceptable by the MFP 100. Thereafter, in S810, the available function/service confirmation is performed. In this case, the MFP 100 does not care whether the MFP 100 is to operate as the group owner or the client, and thus in step S812, the MFP 100 sets the owner intent value thereof taking into account the role of the communication partner apparatus specified in the information indicating whether the communication partner apparatus wants to operate as the group owner or the client. That is, in the available function/service confirmation in S810, the MFP 100 receives, from the communication partner apparatus (for example, the portable terminal 200) information indicating which role (the group owner or the client) the communication partner apparatus wants to take, and in S812, according to the received information, the processing flow branched to S813, S814, or S815. In a case where the group owner is specified in the information indicating which role (the group owner or the client) the communication partner apparatus wants to take, the processing flow proceeds to S813. In a case where the information indicates that the communication partner apparatus does not care about the role, the processing flow proceeds to S814. In a case where the information indicates that the communication partner apparatus wants to operate as the client, the processing flow proceeds to S815.

In S808, the MFP 100 specifies the group owner in the information indicating which role (the group owner or the client) the MFP 100 wants to take. Thereafter, in the available function/service confirmation in step S811, the MFP 100 transmits, to the communication partner apparatus, the information indicating that the MFP 100 wants to operate as the group owner. In this case, the MFP 100 expects that the communication partner apparatus will set the Owner Intent thereof to a value equal to or smaller than 14 according to the information transmitted from the MFP 100, and in S815 the MFP 100 sets the Owner Intent of the MFP 100 to 15. S813 to S816 are similar to S706, S707, and S709 in FIG. 7, and thus a further description thereof is omitted.

S813 to S816 are similar to S706, S707, and S709 in FIG. 7, and thus a further description thereof is omitted.

In the processing flow in FIG. 8, as described above, in the phase of P1002 before the P1003, depending on the contents of the setting of the MFP 100 or the state of the battery, the MFP 100 transmits to the communication partner apparatus the information indicating which role (the group owner or the client) the MFP 100 wants to take. This reduces the probability that the process of determining the roles fails. That is, in a case where the communication partner apparatus adjust the Owner Intent value thereof based on the information transmitted from the MFP 100, it is possible to successfully determine the roles. That is, the MFP 100 is allowed to determine whether the MFP 100 is to operate as the group owner or the client depending on the setting of the MFP 100 or the state of the battery, which makes it possible to prevent unintended power consumption from occurring.

FIG. 9 illustrates another example of a process which is similar to that illustrated in the flow chart in FIG. 7 except that steps S710 to S713 are added. The process illustrated in the flow chart in FIG. 9 is performed in a case where a user sets the MFP 100 to operate as an autonomous group owner.

S701 to S709 are similar to those in FIG. 7, and thus a further description thereof is omitted. In a case where it is determined in S702 that the MFP 100 is set to operate as the group owner, the MFP 100 further determines whether the autonomous group owner is specified (S710). In a case where the Autonomous group owner is specified (Yes in S710), the MFP 100 determines whether the Autonomous group owner is set in the communication partner apparatus (S711). In a case where the Autonomous group owner is not set in the MFP 100 (No in S710), the MFP 100 performs a process in S709. That is, in this case, even when the owner intent of the communication partner apparatus is set to a value of 15, the MFP 100 determines as No in S710 and performs the process in S709.

In a case where the determination in S711 is Yes, the MFP 100 determines that the connection has failed (S712). In S712, the MFP 100 may display a message indicating that the connection has failed.

In a case where the determination in S711 is No, the MFP 100 sets itself to operate as the group owner (that is, the MFP 100 is set to function as an access point), and the connection is established. That is, the process illustrated in FIG. 10 includes S710 to S713 added to the process illustrated in the flow chart of FIG. 8. The process from S710 to S713 has already described above, and thus a further description thereof is omitted.

Figure 10A:
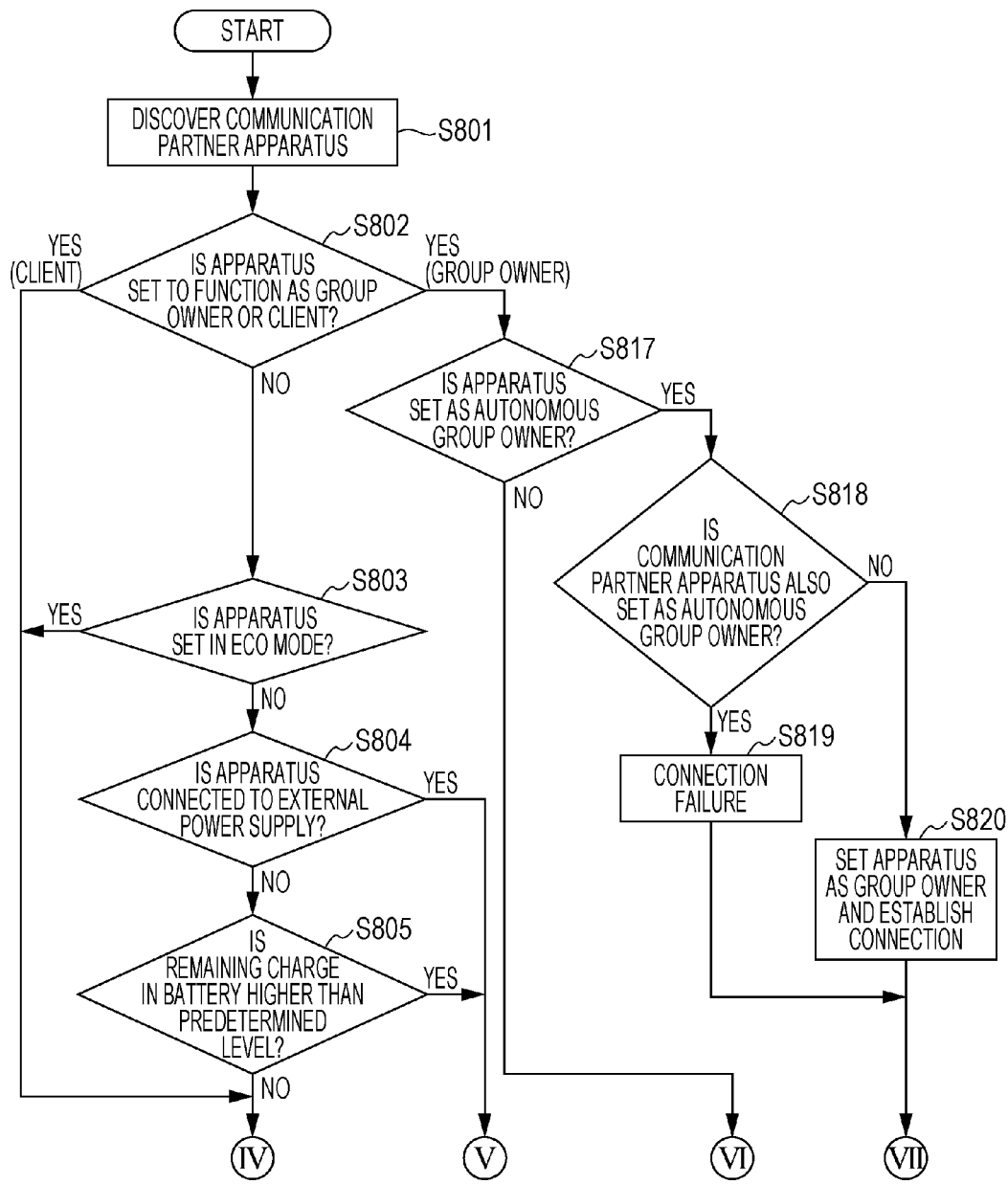
FIGS. 10A and 10B are flow charts illustrating a process of determining roles.
Figure 10B:
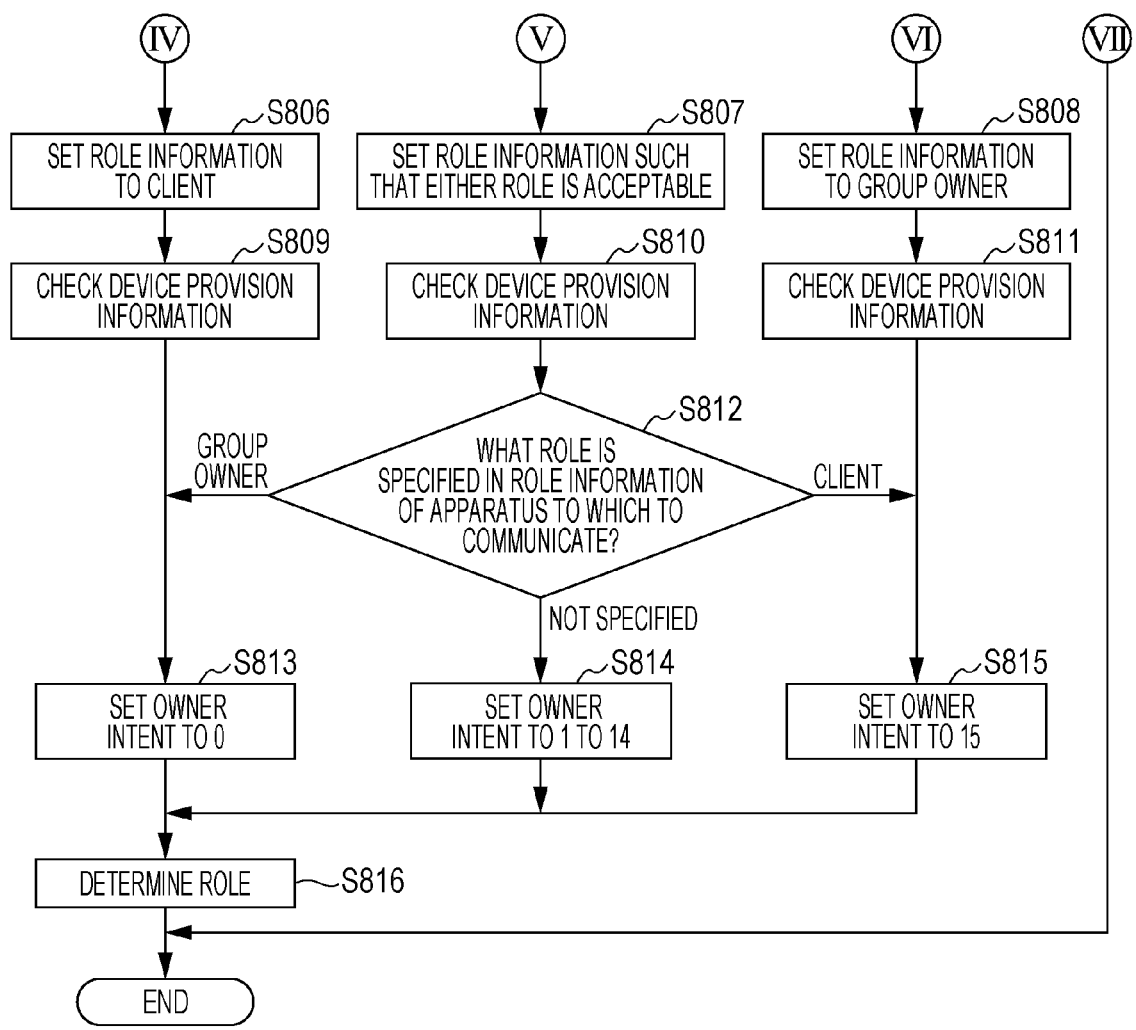

FIGS. 10A and 10B illustrate another process similar to that FIG. 8 except that S710 to S713 are added. The process from S710 to S713 has already described above, and thus a further description thereof is omitted.

In an alternative example, the MFP 100 may change contents of information displayed on the operation unit 107 depending on at least one of the state of the connection between the power supply unit 116 and the external power supply (AC power supply), and the remaining charge in the battery. More specifically, when a user wants to use a Wi-Fi Direct® (WFD) connection, the user selects Wi-Fi Direct® (WFD) via the operation unit 107 of the MFP 100. In this state, if the MFP 100 determines that the power supply unit 116 is not connected to an external power supply (AC power supply) (or the remaining charge in the battery is lower than a specific value), information is displayed on the screen such that the user recognizes that selection of Wi-Fi Direct® (WFD) is not allowed. For example, Wi-Fi Direct® (WFD) is displayed in gray-out on a menu, or Wi-Fi Direct® (WFD) is not displayed on the menu. Alternatively, Wi-Fi Direct® (WFD) may be displayed on the menu, but Wi-Fi Direct® (WFD) is not executed when it is selected. In the case where the Wi-Fi Direct® (WFD) is disabled, a user communicates with a communication partner apparatus, for example, using Wi-Fi Protected Setup (WPS). In a case where the communication partner apparatus is capable of functioning as an access point, the user establishes a WPS connection by pressing down push buttons of the MFP 100 and the communication partner apparatus. On the other hand, in a case where the communication partner apparatus is not capable of functioning as an access point, the user presses down push buttons of the MFP 100 and a device (for example, a router) that is capable of operating as an access point. Furthermore, the user presses down push buttons of the communication partner apparatus and the device (for example, the router) capable of operating as the access point such that it becomes possible for the MFP 100 and the communication partner apparatus to communicate with each other via the device (for example, the router) capable of operating as the access point. Note that the WPS connection may also be established by inputting PIN code instead of pressing the push button.

In the embodiments, as described above, the MFP 100 performs the process of setting the Intent Owner value or changing the content of displayed information. Note that the embodiments may also be applied to various kinds of devices including a portable telephone, a smartphone, a notebook-type personal computer, a table terminal, a PDA (Personal Digital Assistant) device, a digital camera, and so on.

The embodiments may also be realized by executing the following process. Software (a program) for realizing the functions of the embodiments may be supplied to a system or an apparatus via a network or a storage medium, and a computer (or a CPU, a MPU, or the like) of the system or the apparatus may read the program and execute it. The program may be executed by a single computer, or may be cooperatively executed by a plurality of computers. Alternatively, there may be provided hardware such as a circuit or the like configured to execute part of the program, and the process according to the embodiments may be cooperatively performed by the hardware of the circuit of the like and software executed by a computer.

As may be seen from the above discussion, embodiments make is possible to control whether a communication apparatus is to function as an access point in wireless communication in the peer-to-peer mode taking into account power consumption.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-125882, filed Jun. 14, 2013, and 2014-054177, filed Mar. 17, 2014 which are hereby incorporated by reference herein in their entirety.

What is claimed is:

1. A communication apparatus capable of wirelessly communicating with a communication partner apparatus, the communication apparatus comprising:
   memory; and
   one or more processors, the one or more processors configured to:
      send, in a case where the communication apparatus is in a power saving status to reduce power consumption, information indicating that the communication apparatus does not operate as an access point to the communication partner apparatus;
      set an intent value to be lower than a predetermined value after the information is sent, wherein the intent value indicates a degree of intent to operate as an access point in a wireless communication; and
      send the set intent value to the communication partner apparatus.

2. The communication apparatus according to claim 1, wherein in a case where the communication apparatus is not in the power saving status and no power is supplied from an external power supply, the information indicating that the communication apparatus does not operate as an access point is sent to the communication partner apparatus and the intent value is set lower than the predetermined value.

3. The communication apparatus according to claim 2, wherein in a case where the role information is sent to the communication partner apparatus, the intent value is set based on information received from the communication partner apparatus.

4. The communication apparatus according to claim 1, wherein in a case where the communication apparatus is not in the power saving status and a remaining charge of a battery is less than a particular value, the information indicating that the communication apparatus does not operate as an access point is sent to the communication partner apparatus and the intent value is set lower than the predetermined value.

5. The communication apparatus according to claim 1, wherein, in a case where the communication apparatus is in the power saving status to reduce power consumption, the intent value is set to 0.

6. The communication apparatus according to claim 1, wherein the power saving status is set according to a command issued by a user.

7. The communication apparatus according to claim 1, wherein, in a case where the communication apparatus has been in an unused state for a particular period, the power saving status is set.

8. The communication apparatus according to claim 1, wherein the communication apparatus is capable of wirelessly communicating with the communication partner apparatus in a peer-to-peer mode.

9. The communication apparatus according to claim 1, wherein the one or more processors are further configured to:
   in a case where the communication apparatus is not in a power saving status to reduce power consumption and the power is supplied from an external power supply, determine whether to indicate that the communication partner apparatus is operated as a group owner or to indicate that the communication partner apparatus is operated as a client, wherein, in a case where a determination is made to indicate that the information of communication partner apparatus operates as a group owner, set the intent value to be lower than the predetermined value.

10. The communication apparatus according to claim 1, wherein in a case where the communication apparatus is not in the power saving status and power is supplied from an external power supply, role information indicating that a role is acceptable by the communication apparatus is sent to the communication partner apparatus, and wherein the role is either a first role indicating operating as the access point or a second role indicating not operating as the access point.

11. A method of controlling a communication apparatus capable of wirelessly communicating with a communication partner apparatus, the method comprising:
at the communication apparatus, sending, in a case where the communication apparatus is in a power saving status to reduce power consumption, information indicating that the communication apparatus does not operate as an access point to the communication partner apparatus;
setting an intent value to be lower than a predetermined value after the information is sent, wherein the intent value indicates a degree of intent to operate as an access point in a wireless communication; and
sending the set intent value to the communication partner apparatus.

12. The method according to claim 11, wherein in a case where the communication apparatus is not in the power saving status and power is supplied from an external power supply, role information indicating that a role is acceptable by the communication apparatus is sent to the communication partner apparatus, and wherein the role is either a first role indicating operating as the access point or a second role indicating not operating as the access point.

13. The method according to claim 11, wherein in a case where the communication apparatus is not in the power saving status and no power is supplied from an external power supply, the information indicating that the communication apparatus does not operate as an access point is sent to the communication partner apparatus and the intent value is set lower than the predetermined value.

14. The method according to claim 13, wherein in a case where the role information is sent to the communication partner apparatus, the intent value is set based on information received from the communication partner apparatus.

15. The method according to claim 11, wherein in a case where it is determined that the communication apparatus is not in the power saving status and a remaining charge of a battery is less than a particular value, the information indicating that the communication apparatus does not operate as an access point is sent to the communication partner apparatus and the intent value is set lower than the predetermined value.

16. A non-transitory computer readable storage medium storing computer executable instructions configured to control a communication apparatus capable of wirelessly communicating with a communication partner apparatus, the computer executable instructions comprising instructions for:
at the communication apparatus, sending, in a case where the communication apparatus is in a power saving status to reduce power consumption, information indicating that the communication apparatus does not operate as an access point to the communication partner apparatus;
setting an intent value to be lower than a predetermined value after the information is sent, wherein the intent value indicates a degree of intent to operate as an access point in a wireless communication; and
sending the set intent value to the communication partner apparatus.

17. The non-transitory computer readable storage medium according to claim 16, wherein in a case where it is determined that the communication apparatus is not in the power saving status and no power is supplied from an external power supply, the information indicating that the communication apparatus does not operate as an access point is sent to the communication partner apparatus and the intent value is set lower than the predetermined value.

18. The non-transitory computer readable storage medium according to claim 17, wherein in a case where the role information is sent to the communication partner apparatus, the intent value is set based on information received from the communication partner apparatus.

19. The non-transitory computer readable storage medium according to claim 16, wherein in a case where it is determined that the communication apparatus is not in the power saving status and a remaining charge of a battery is less than a particular value, the information indicating that the communication apparatus does not operate as an access point is sent to the communication partner apparatus and the intent value is set lower than the predetermined value.

20. The non-transitory computer readable storage medium according to claim 16, wherein in a case where the communication apparatus is not in the power saving status and power is supplied from an external power supply, role information indicating that a role is acceptable by the communication apparatus is sent to the communication partner apparatus, and wherein the role is either a first role indicating operating as the access point or a second role indicating not operating as the access point.

* * * * *